United States Patent [19]

Fain

[11] Patent Number: 5,353,747
[45] Date of Patent: Oct. 11, 1994

[54] SYSTEMS FOR LEASHING DOGS AT ANY ONE OF A PLURALITY OF LOCATIONS

[76] Inventor: Bob C. Fain, 5 Utley St., So. Dartmouth, Mass. 02748

[21] Appl. No.: 206,330

[22] Filed: Mar. 7, 1994

[51] Int. Cl.⁵ ............................................. A01K 3/00
[52] U.S. Cl. .................................... 119/780; 119/786
[58] Field of Search ............... 119/786, 787, 788, 790, 119/791, 780, 781, 782; 52/165, 156, 155; 248/156, 131

[56] References Cited

U.S. PATENT DOCUMENTS

| | | | |
|---|---|---|---|
| 32,601 | 1/1861 | Bush | 119/790 |
| 2,713,327 | 7/1955 | West | 119/790 |
| 3,658,037 | 4/1972 | Hunter | 119/786 |
| 4,634,120 | 1/1987 | Hall | 52/165 |
| 5,031,577 | 7/1991 | Flugger | 119/780 |
| 5,044,323 | 9/1991 | Papak | 119/786 |
| 5,165,663 | 11/1992 | Wells | 52/165 |

Primary Examiner—Gene Mancene
Assistant Examiner—Todd E. Manahan
Attorney, Agent, or Firm—Michael J. Colitz, Jr.

[57] ABSTRACT

A system for leashing dogs at any one of a plurality of locations comprises a first exterior hollow post having a circular cross-section positioned in the ground with a lower end beneath the ground and an upper end adjacent to ground level; a second interior hollow post slidably received within the exterior post, the interior post being of a length no greater than the length of the exterior post, a carriage bolt slidably received within the interior post having a head of a diameter greater than the external diameter of the interior post; and a coupling component having a large aperture received by the carriage bolt and retained in position between the upper edge of the interior post and the head of the carriage bolt. The coupling component also includes a small aperture and an associated chain link. The chain link has screw threads at its opposed ends with a threaded exterior member adapted to be rotated to expose and close an opening between the link ends thereadjacent. A leash is coupled between the chain link and a clip adapted to be secured to the collar of a dog.

5 Claims, 3 Drawing Sheets

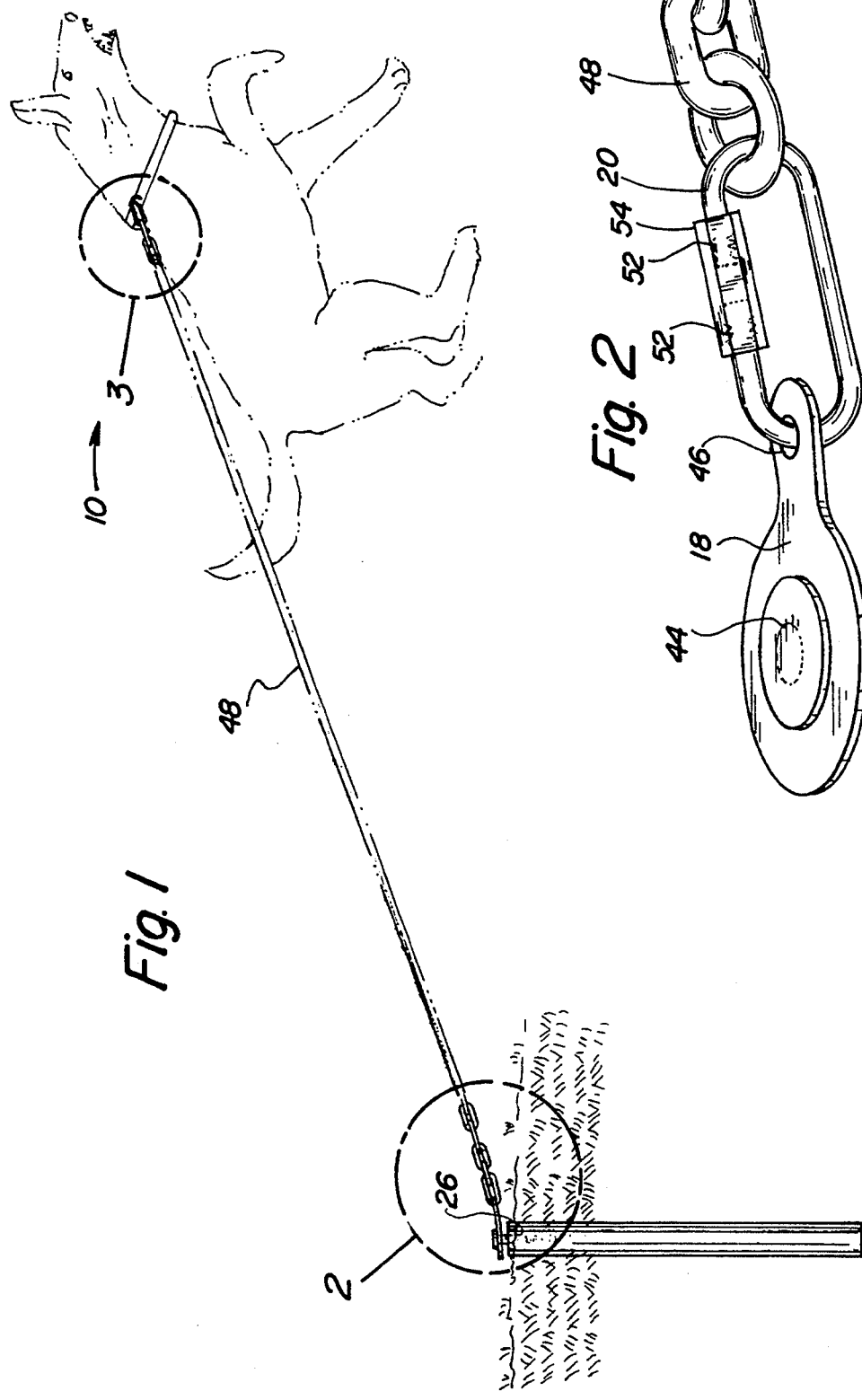
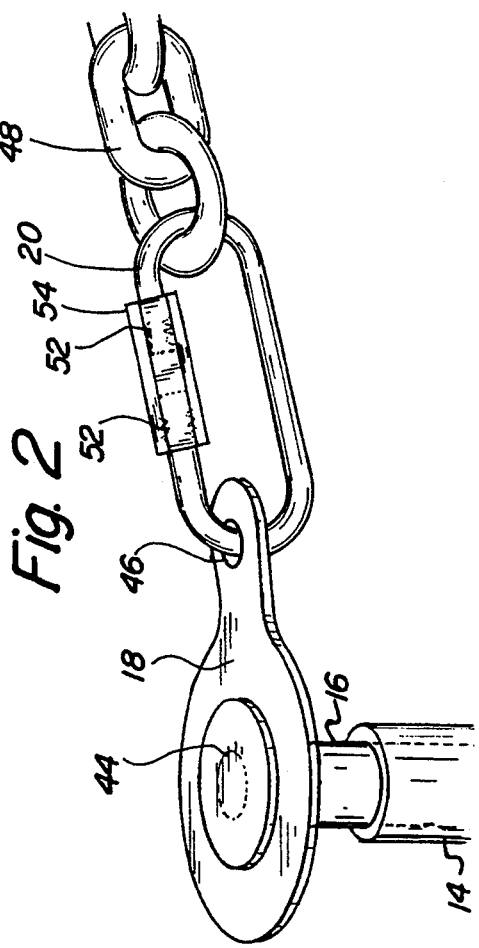

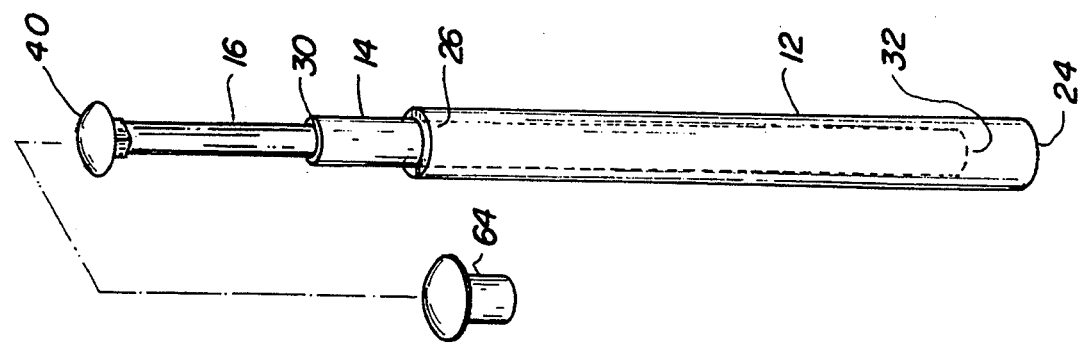
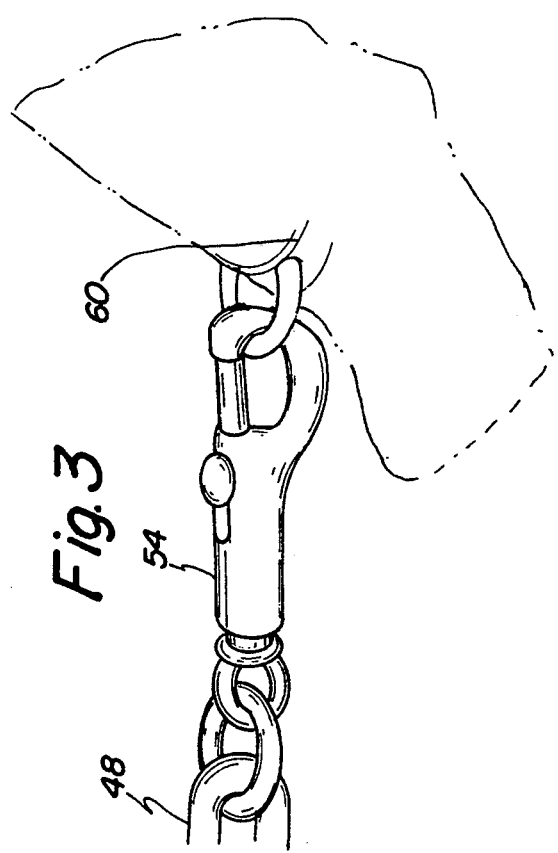

SYSTEMS FOR LEASHING DOGS AT ANY ONE OF A PLURALITY OF LOCATIONS

BACKGROUND OF THE INVENTION

1. Field of the Invention

The present invention relates to systems for leashing dogs at any one of a plurality of locations and more particularly pertains to leashing dogs with a system comprising a plurality of hollow posts located within the ground and separable components to allow the ready movement of the location from where the dog is leashed.

2. Description of the Prior Art

The use of dog leashes is known in the prior art. More specifically, dog leashes heretofore devised and utilized for the purpose of leashing dogs so that they may exercise themselves is known to consist basically of familiar, expected, and obvious structural configurations, notwithstanding the myriad of designs encompassed by the crowded prior art which has been developed for the fulfillment of countless objectives and requirements.

The prior art discloses a large number of dog leashes. By way of example, U.S. Pat. No. 4,827,876 to Krekelberg discloses a dog leash attachment.

U.S. Pat. No. 4,831,798 to Otteson discloses a ground anchoring stake.

U.S. Pat. Nos. 4,982,701 and 5,044,323 to Papak disclose animal tethering devices.

U.S. Pat. No. 5,003,929 to Dean discloses a tangle-resistant pet tie apparatus and method.

U.S. Pat. No. 5,031,577 to Flugger discloses another tangle-free tether post assembly.

In this respect, systems for leashing dogs at any one of a plurality of locations according to the present invention substantially depart from the conventional concepts and designs of the prior art, and in doing so provide an apparatus primarily developed for the purpose of leashing dogs with a system comprising a plurality of hollow posts located within the ground and separable components to allow the ready movement of the location from where the dog is leashed.

Therefore, it can be appreciated that there exists a continuing need for new and improved systems for leashing dogs which can be used for leashing dogs with a system comprising a plurality of hollow posts located within the ground and separable components to allow the ready movement of the location from where the dog is leashed. In this regard, the present invention substantially fulfills this need.

SUMMARY OF THE INVENTION

In view of the foregoing disadvantages inherent in the known types of dog leashes now present in the prior art, the present invention provides improved systems for leashing dogs at any one of a plurality of locations. As such, the general purpose of the present invention, which will be described subsequently in greater detail, is to provide new and improved systems for leashing dogs at any one of a plurality of locations and methods which have all the advantages of the prior art and none of the disadvantages.

To attain this, the present invention essentially comprises a new and improved system for leashing dogs at any one of a plurality of locations comprising, in combination, a first exterior hollow post having a circular cross-section positionable in the ground with a lower end beneath the ground and an upper end adjacent to ground level. A second interior hollow post is slidably receivable within the exterior post, the interior post being of a length no greater than the length of the exterior post. A carriage bolt adapted to be slideably receivable within the interior post, the carriage bolt having a head of a diameter greater than the external diameter of the interior post. A coupling component has a large aperture adapted to be received by the carriage bolt and to be retained in position between the upper edge of the interior post and the head of the carriage bolt, the coupling component also including a small aperture and an associated chain link, the chain link having screw threads at its opposed ends with a threaded exterior member adapted to be rotated to expose and close an opening between the link ends thereadjacent, and a leash coupled between the chain link and a clip adapted to be secured to the collar of a dog. A cap piece has a cylindrical member adapted to be received within the top end of the exterior post when the interior post is removed, the cap piece having a head with a diameter greater than the interior diameter of the exterior post. A point is formed at the lower end of the external post. A supplemental cap has a cylinder positionable within the external cylinder and a flat head adapted to facilitate hammering of the exterior cylinder into the ground with a foam layer on the lower surface of the head.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved systems for leashing dogs at any one of a plurality of locations which have all the advantages of the prior art dog leashes and none of the disadvantages.

It is another object of the present invention to provide new and improved systems for leashing dogs at any one of a plurality of locations which may be easily and efficiently manufactured and marketed.

It is a further object of the present invention to provide new and improved systems for leashing dogs at any one of a plurality of locations which are of a durable and reliable construction.

An even further object of the present invention is to provide new and improved systems for leashing dogs at any one of a plurality of locations which are susceptible of a low cost of manufacture with regard to both materials and labor, and which accordingly are then susceptible of low prices of sale to the consuming public, thereby making such systems for leashing dogs at any one of a plurality of locations economically available to the buying public.

Still yet another object of the present invention is to provide new and improved systems for leashing dogs at any one of a plurality of locations which provide in the apparatuses and methods of the prior art some of the advantages thereof, while simultaneously overcoming some of the disadvantages normally associated therewith.

Even still another object of the present invention is to leash dogs with a system comprising a plurality of hollow posts located within the ground and separable components to allow the ready movement of the location from where the dog is leashed.

Lastly, it is an object of the present invention to provide a system for leashing dogs at any one of a plurality of locations comprising a first exterior hollow post having a circular cross-section positionable in the ground with a lower end beneath the ground and an upper end adjacent to ground level; a second interior hollow post slidably receivable within the exterior post, the interior post being of a length no greater than the length of the exterior post, a carriage bolt adapted to be releasably secured to the interior post, the carriage bolt having a head of a diameter greater than the external diameter of the interior post; and a coupling component having a large aperture adapted to be received by the carriage bolt and to be retained in position between the upper edge of the interior post and the head of the carriage bolt, the coupling component also including a small aperture and an associated chain link, the chain link having screw threads at its opposed ends with a threaded exterior member adapted to be rotated to expose and close an opening between the link ends thereadjacent, and a leash coupled between the chain link and a clip adapted to be secured to the collar of a dog.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the new and improved system for leashing dogs at any one of a plurality of locations constructed in accordance with the principles of the present invention.

FIG. 2 is an enlarged perspective view of the coupling between the post and the adjacent end of the leash taken at circle 2 of FIG. 1.

FIG. 3 is an enlarged perspective illustration of the coupling between the dog's collar and the adjacent end of the leash taken at circle 3 of FIG. 1.

FIG. 4 is an enlarged perspective view of that portion of the system adapted to receive the leash.

The same reference numerals refer to the same parts throughout the various Figures.

DESCRIPTION OF THE PREFERRED EMBODIMENT

Figure 6:
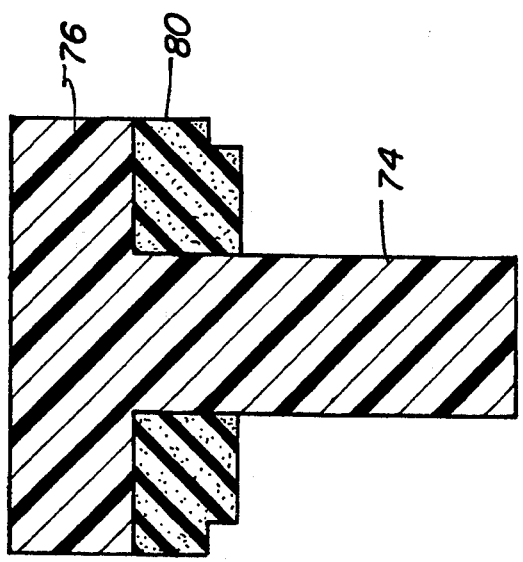
FIG. 6 is a cross-sectional view taken along line 6—6 of FIG. 5.

With reference now to the drawings, and in particular to FIGS. 1 through 4 thereof, the preferred embodiment of the new and improved system for leashing dogs at any one of a plurality of locations embodying the principles and concepts of the present invention and generally designated by the reference numeral 10 will be described.

Specifically, the system 10 of the present invention may be considered, in its broadest context, as having five major components, the exterior post 12, the interior post 14, the carriage bolt 16, the coupling component 18 and a chain link 20.

More specifically, the exterior post is a first post 12. It has a circular cross-sectional configuration. In operation in use it is positioned in the ground with its lower end 24 beneath the ground. Its upper end 26 is located adjacent to ground level. A plurality of such posts are preferably utilized with the system. The plurality of such first exterior posts may be selectively used for leashing a dog at any one of a plurality of locations.

In association with the first post is a second post 14. The second post is an interior hollow post. It is sized and configured to slidably be received within the interior of the exterior post 12. The interior post, like the exterior post has an upper end 30 and a lower end 32. The length of the interior post is preferably shorter than that of the exterior post. It should not be longer than the exterior post. The interior post is adapted to be selectively positioned within any of the plurality of the exterior posts at the discretion of a user. This allows the dog to be leashed at any one of a plurality of locations defined by the locations of the exterior posts.

The next component of the system is a carriage bolt 16. The carriage bolt has a main portion of a cylindrical configuration. Located at the upper end of the carriage bolt is a head 40. The carriage bolt is adapted to be slidably received within the interior of the interior post. The head of the carriage bolt preferably has a diameter greater than the external diameter of the interior cylinder. As a result, a bearing surface is provided between the carriage bolt and the upper end of the interior cylinder when coupled together for operation and use.

The next significant component of the system is the coupling component 18. The coupling component 18 has a large aperture 44. The large aperture is adapted to be received by the carriage bolt and to be retained in position during operation and use between the upper edge of the interior post and the lower face of the head 40 of the carriage bolt. The coupling component is simply a sturdy, rigid piece of metal in a generally teardrop configuration. The coupling device also has a small aperture 46 for securement to the leash.

Intermediate the small aperture 46 and the leash 48 is a chain link 20. The chain link has screw threads 52 at its opposed ends to define a space therebetween. Also included is a threaded exterior member 54 of a hollow cylindrical configuration. The exterior member is adapted to be located over the screw threads 54 of the link 20. Rotation in one direction or the other will alternately expose or close the opening between the link ends thereadjacent. This allows the coupling or release of the leash from the chain link and, hence, the interior post.

The leash 48 may be of any conventional construction. The one end of the leash includes a clip 54 for securement to the collar 60 of the dog to be leashed. The other end is adapted to be coupled to the chain link.

FIG. 4, an exploded view, shows a supplemental cap piece 64. The supplemental cap piece has a cylindrical section and an enlarged head. The size and shape of this end piece 64 is such that when the interior post and carriage bolt are removed from an exterior post, the cap piece is located over the top to preclude debris from entering the un-utilized exterior post and filling it with debris. A plurality of such end pieces are required, one for each exterior post not being utilized.

Figure 5:
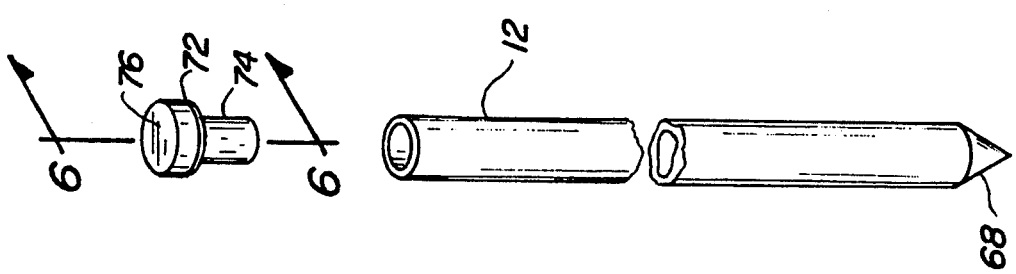
FIG. 5 is a perspective illustration similar to FIG. 4 but of an alternate embodiment of the invention.

FIGS. 5 and 6 show an alternate embodiment of the invention. In the FIG. 5 embodiment, the exterior post is formed with a point 68 at its lower end. Such point is utilized in hammering the exterior post into a proper, preferred orientation within the ground.

FIG. 5 also shows an additional feature of the invention. Such feature is a supplemental cap 72. Such supplemental cap has a cylindrical extent 74 positionable within the exterior cylinder. It also has a cap 76 with a flat head. The head is of a diameter greater than that of the exterior cylinder. Such supplemental cap is preferably positioned within the exterior cylinder prior to operation and use. The flat upper surface of the cap facilitates the hammering of the exterior post into the ground at a proper location. A foam layer 80 is preferably secured to the lower surface of the head to minimize noise during hammering and to preclude chipping and abrading of the upper edge of the exterior cylinder.

The present invention is a unique system by which a dog can be leashed outside and have greater freedom of movement than a regular tie-out provides. With the present invention, the pet will be able to move freely in a 360-degree circle around the submerged center pin of the device without becoming tangled.

The present invention consists of various major parts. The first is a hollow one-inch diameter schedule 80 PVC pipe 18 inches long; the second, a hollow one-half inch diameter schedule 80 PVC pipe 18 inches long. The third part is a one-half inch diameter carriage bolt center pin 12 inches long. The half-inch pipe telescopes into the one inch pipe, and both are driven into the ground flush with the surface and perpendicular to the slope of the ground. The carriage bolt center pin is then dropped into the two-pipe device. The inner of the two pipes serves as a sleeve to insure rotation of the center pin as the dog moves around. A half inch quick link fastens a suitable lead or chain 15 to 20 feet long to the center pin.

The present invention can easily be relocated to another part of the owner's lawn to save wear and tear on one spot. This is done simply by lifting the center pin, with its attached chain, out of the two-pipe device, and inserting it into a duplicate device in the new spot.

A bright, neon-colored plastic plug, measuring one and one-third inches deep and two inches in diameter, is inserted into the device after the present invention's center pin is removed. This plug enables the user to be able to find the present invention's old location quickly and easily. A company logo could be imprinted on the top of the plug for additional advertising purposes.

The present invention could be produced in a variety of sizes and strengths to adapt it to any size dog. In addition, the present invention is installed completely flush with the surface of the ground, and therefore does not create a hazard for a walking or running person or for the lawnmower.

In today's busy culture, we often do not have time to take the dog on a long leashed walk, or to stay outside for extended periods to supervise him. The present invention eliminates the need to do either of these things. To most dog owners, as evidenced by the sheer numbers of how many of us own dogs and how much money we spend on them, the pet's happiness and safety are of high importance.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A system for leashing dogs at any one of a plurality of locations comprising:
   a first exterior hollow post having a circular cross-section positionable in the ground with a lower end beneath the ground and an upper end adjacent to ground level;
   a second interior hollow post slidably receivable within the exterior post, the interior post being of a length no greater than the length of the exterior post;
   a carriage bolt slideably receivable within the interior post the carriage bolt having a head of a diameter greater than the external diameter of the interior post; and a coupling component having a large aperture adapted to be received by the carriage bolt and to be retained in position between the upper edge of the interior post and the head of the carriage bolt, the coupling component also including a small aperture and an associated chain link, the chain link having screw threads at its opposed ends with a threaded exterior member adapted to be rotated to expose and close an opening between the link ends thereadjacent for coupling to a leash.

2. The system as set forth in claim 1 and further including a point formed at the lower end of the external post.

3. The system as set forth in claim 1 and further including:
a cap piece having a cylindrical member adapted to be received within the top end of the exterior post when the interior post is removed, the cap piece having a head with a diameter greater than the interior diameter of the exterior post.

4. The system as set forth in claim 1 and further including:
a supplemental cap having a cylinder positionable within the external cylinder and a flat head adapted to facilitate hammering of the exterior cylinder into the ground with a foam layer on the lower surface of the head.

5. A new and improved system for leashing dogs at any one of a plurality of locations comprising, in combination:
a first exterior hollow post having a circular cross-section positionable in the ground with a lower end beneath the ground and an upper end adjacent to ground level;
a second interior hollow post slidably receivable within the exterior post, the interior post being of a length no greater than the length of the exterior post;
a carriage bolt slidably receivable within the interior post, the carriage bolt having a head of a diameter greater than the external diameter of the interior post;
a coupling component having a large aperture adapted to be received by the carriage bolt and to be retained in position between the upper edge of the interior post and the head of the carriage bolt, the coupling device also including a small aperture and an associated chain link, the chain link having screw threads at its opposed ends with a threaded exterior member adapted to be rotated to expose and close an opening between the link ends thereadjacent, and a leash coupled between the chain link and a clip adapted to be secured to the collar of a dog;
a cap piece having a cylindrical member adapted to be received within the top end of the exterior post when the interior post is removed, the cap piece having a head with a diameter greater than the interior diameter of the exterior post;
a point formed at the lower end of the external post; and
a supplemental cap having a cylinder positionable within the external cylinder and a flat head adapted to facilitate hammering of the exterior cylinder into the ground with a foam layer on the lower surface of the head.

* * * * *